Jan. 26, 1965  J. HEIDENHAIN  3,167,605
PHOTO-ELECTRIC MEASURING AND ADJUSTING DEVICE
Filed Oct. 27, 1959  4 Sheets-Sheet 1

INVENTOR
JOHANNES HEIDENHAIN
BY
ATTORNEY.

Jan. 26, 1965   J. HEIDENHAIN   3,167,605
PHOTO-ELECTRIC MEASURING AND ADJUSTING DEVICE
Filed Oct. 27, 1959   4 Sheets-Sheet 2

INVENTOR
JOHANNES HEIDENHAIN
BY
ATTORNEY.

INVENTOR
JOHANNES HEIDENHAIN
BY
ATTORNEY.

Jan. 26, 1965   J. HEIDENHAIN   3,167,605
PHOTO-ELECTRIC MEASURING AND ADJUSTING DEVICE
Filed Oct. 27, 1959   4 Sheets-Sheet 4

INVENTOR
JOHANNES HEIDENHAIN
BY
ATTORNEY.

United States Patent Office 3,167,605
Patented Jan. 26, 1965

3,167,605
PHOTO-ELECTRIC MEASURING AND
ADJUSTING DEVICE
Johannes Heidenhain, Egerer, near Chieming, Germany,
assignor to Fa. Wenczler & Heidenhain, Patentverwertung, Traunreut, Upper Bavaria, near Traunstein, Germany, a corporation of Germany
Filed Oct. 27, 1959, Ser. No. 848,990
Claims priority, application Germany, Nov. 7, 1958,
W 24,416
2 Claims. (Cl. 88—14)

The present invention relates to a photo-electric measuring and adjusting device.

Photo-electric microscopes for the measuring of division markers are known, wherein the division markers or their images are measured by oscillating scanning elements.

The advantages of these devices are their high exactness and the possibility for automation of measuring and adjustment processes, since the measuring result appears on photo-electric microscopes in form of electrical voltages, which can operate control motors over suitable augmentors.

The disadvantages are a small range of vision, a non-linear scale and the fact that highest constancy may be achieved only outside of the neutral point by exerting a very great effort, so that the devices operate in a most reliable manner as zero devices. The bridging-over of larger measuring ways, for instance of a full millimeter, is, for this reason, not easily possible.

It is, therefore, one object of the present invention to provide a photoelectric measuring and adjusting device, which permits the exact measurement or adjustment manually or automatically, even in case of deviations from the neutral position and upon bridging over larger measuring ways. Basically, there are two types of photoelectric microscopes, namely those which operate with oscillating light rays and those which operate with oscillating diaphragms. For the purpose of simplification, the present device is described below merely in connection with the second type of apparatus, and in particular in connection with a device which operates with a moving cross hair.

With these and other objects in view, which will become apparent in the following detailed description, the present invention will be clearly understood in connection with the accompanying drawings, in which.

Figure 1:
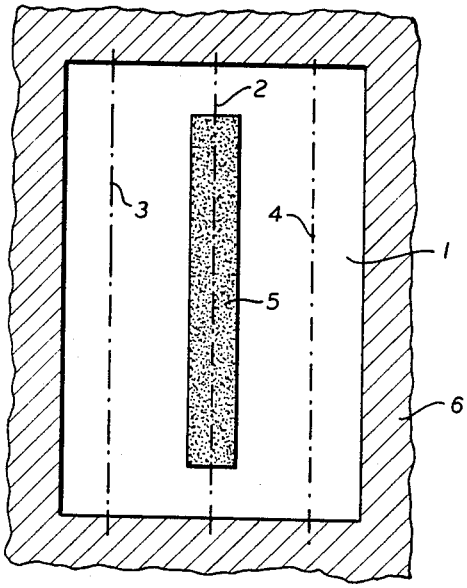
FIGURE 1 is a schematic view of the range of vision of a moving cross hair device.

Referring now to the drawings, and in particular to FIG. 1, it will be apparent that the range of vision 1 of a moving cross hair device is shown. The center line of the moving cross hair is indicated for three drawn positions during the moving process by point-dotted lines. The center line 2 is shown during the passing of the zero or neutral position, while also the left and right extreme positions 3 and 4 are indicated. The image 5 of the scale marker to be measured is shown in the moving plane of the hair. A diaphragm 6 limits the range of vision to the required size. The measuring range of the microscope embraces the range which is subjected to scanning during the moving process.

The device operates briefly in the following manner:

If the gravitation line of the scale marker image 5 is shown in the position indicated in FIG. 1, in which it coincides with the resting position 2 of the hair, the device delivers the original voltage. If the image of the scale marker is moved to the left, for instance, a negative original voltage results, which is the larger, the farther the line is removed from the zero or neutral position. Upon moving towards the right, a corresponding positive original voltage results. If the scale is disposed on a movable table, a D.C. control motor, the direction of rotation of which depends on the polarity of the feeding voltage and which is controlled by the original voltage of the microscope, can assume the automatic adjustment of the image of the scale marker to the zero or neutral position. The motor moves then the table until the original voltage of the microscope reaches the zero or neutral position, that means until the image of the scale marker runs exactly into the zero position given by the zero position of the hair.

The showing in FIG. 1 of the drawing and the description of the device and operation thereof, are part of the prior art and are not the subject matter of the present invention.

Figure 2:
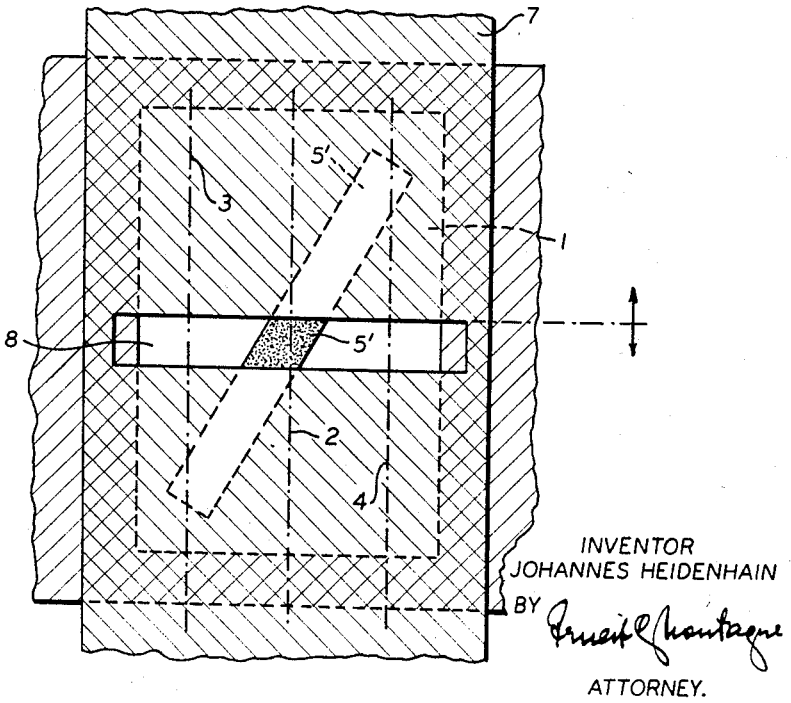
FIG. 2 is a schematic view indicating the principle of the present device.
Figure 3:
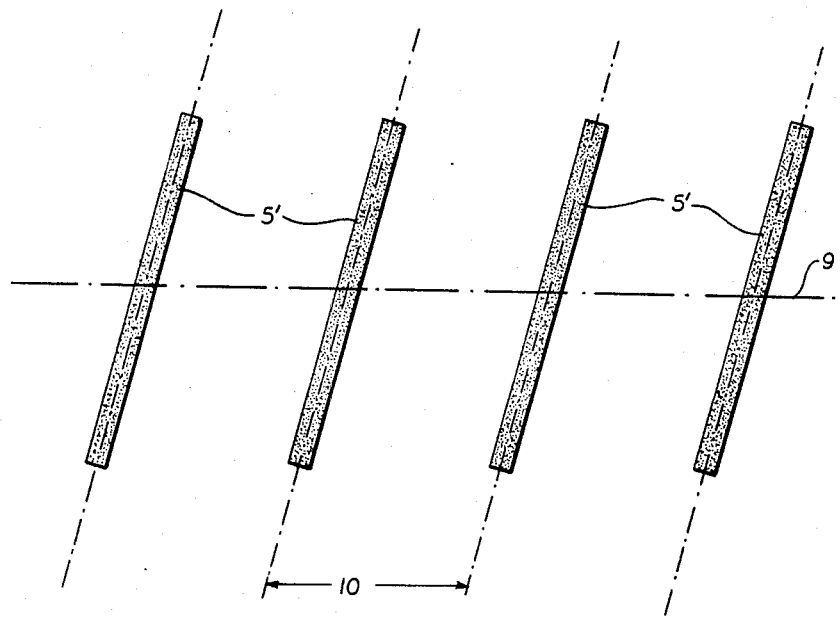
FIG. 3 is a schematic view indicating a scale of the device.

The principle of the present invention is shown in FIG. 2 of the drawing. The showing of FIG. 2 is distinguished over that of FIG. 1 by the fact that the image of the scale marker is inclined relative to the moving cross hair and that an additional diaphragm 7 is provided, which is equipped with a slot 8, which diaphragm exposes only a small portion of the image of the scale marker and is movable relative to the image of the scale marker in the direction indicated by the arrows. The inclined position of the image of the scale marker may be obtained in such manner that the latter is properly turned under the microscope upon scanning a single scale marker only. If several scale markers of a scale are to be scanned, a scale shown in FIG. 3 may be used. The point dotted straight line 9 indicates the direction of the division of the scale. The scale markers 5' are parallel relative to each other and inclined towards a line disposed perpendicularly to the direction of division. The distance between homologous points of division markers in the direction of the scale corresponds with the scale interval 10. It is finally also possible to use a normal scale. In this case, the entire microscope is turned in such manner that the direction of movement of the moving cross hair is inclined towards the direction of the scale markers. In this case, however, a sensitivity loss of the device must be suffered, since the moving cross hair measures only with a component in the direction of division. The displacement of the diaphragm 7 relative to the image of the scale marker may be obtained in such manner, that the diaphragm 7 itself is displaced, yet also in such manner that the microscope is displaced perpendicularly to the direction of division, while the diaphragm 7 remains immovable; or the scale is moved perpendicularly to the direction of division, while the diaphragm 7 is immovable. Finally, the direction of the rays may be deflected by means of a rotatable mirror, or by means of a plane parallel plate in such manner that the image of the scale marker is displaced in the direction indicated by the arrows. All these methods are equivalent as to their result or effect.

Though any one of the indicated methods may be applied in order to bring about this result, this principle will now be explained in connection with a microscope permitting movement of the diaphragm 7 in the direction of the arrows.

The diaphragm 7 has at first the effect that only a small part of the image of the scale marker for the microscope is exposed for measuring purposes. The measuring of such small sections of the image of the scale marker does not offer any difficulties.

If now the diaphragm 7 is disposed, the exposed section of the image of the scale marker travels in the direction of the scale with one component thereof. The size of this component depends, in addition to the length of the path of the diaphragm 7, also upon the inclination of the image of the scale marker towards the direction of the moving cross hair. First of all, the lateral displacement of the exposed section takes places exactly linearly with the displacement path of the diaphragm 7, if the scale marker is straight. The preparation of exactly straight scale markers is possible and is known in connection with the technique of grid manufacturing.

At first, it should be explained how displacements can be measured with the described device. For this purpose, it is assumed that the photo-electric microscope is rigidly mounted and that the scale is secured to a slide movable in the direction of division and the displacement of the slide is to be measured. At first, prior to the start of the displacement of the slide, the diaphragm 7 is adjusted in such a manner, that the microscope indicates the output voltage zero. Then the slide is displaced for a length to be measured and thereafter the diaphragm 7 is displaced in such a manner, that the electrical measuring device of the microscope indicates again an output voltage zero. The displacement of the diaphragm 7, which is read on a suitably provided scale, is a measure for the displacement. The sensitivity of the device depends substantially upon the angle between the image of the scale marker and the moving cross hair.

The measuring process can be rendered automatic to a greater extent. Thus, the displacement of the diaphragm 7 may be brought about by a D.C. control motor, the direction of rotation of which depends upon the polarity of the feeding voltage and which is controlled by the output voltage of the microscope. This motor displaces the diaphragm 7 automatically in such manner, that the output voltage on the device is always zero in the static state. In this case, the position of the slide may be read at all times on the scale which indicates the displacement of the diaphragm 7. Instead of reading the scale of the diaphragm on the microscope, it is also possible to provide a remote reading of any known structure, for instance, by using a digitalic remote reading technique. If the displacement is to be registered automatically, the diaphragm 7 may be formed such, that during displacement of the diaphragm 7, a variable resistance is changed, which resistance is disposed in a bridge branch of a compensation writer.

The advantages of the measuring method are, in addition to the exactness due to the photoelectric microscope, first of all great or high constancy, since the photoelectric microscope is used only as a zero instrument. The reversal of the described measuring method leads to an exact adjustment method. The only required change resides in the fact that the control motor does not perform, in this case, the displacement of the diaphragm 7, rather this motor operates the adjustment device for the table. From the above description, the operation of the device is quite apparent.

The motor moves the table always such, that the exposed section of the image of the scale marker coincides with the center point of the oscillations of the moving cross hair. By a simple displacement of the diaphragm 7, predetermined displacements of the table may be started.

Figure 4:
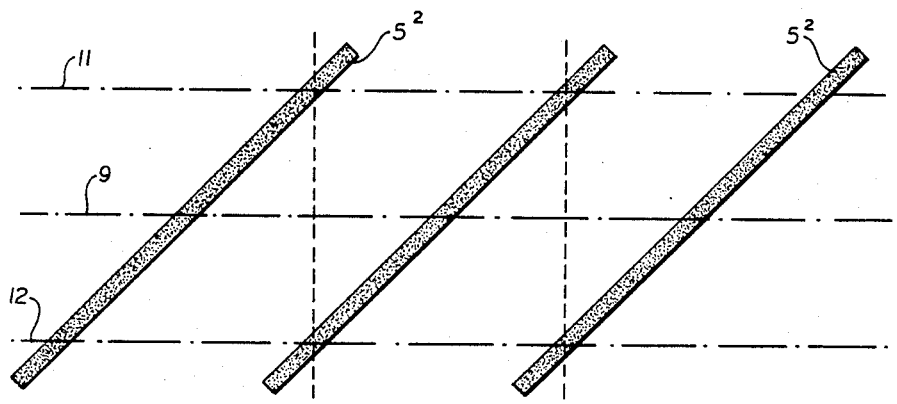
FIG. 4 is a schematic view of a scale designed for longer ways.

The application of the last-mentioned adjustment device lies with all tool machines where a great exactness in the adjustment of tables or tools is required, for instance in connection with dividing machines for the manufacture of very fine subdivisions, engraving machines, cutting machines, etc. One point, however, should be particularly emphasized. By equipment of the adjustment device with a servo-motor, a permanent, continuous adjustment is also possible. Thus, curve lines may be copied, by forming the line to be scanned from the beginning in correspondence with the part to be made. It is, however, also possible to arrive at curved forms by controlling the diaphragm in accordance with a predetermined, suitable function by injecting a second movement of the machine. An advantage is brought about in connection with the manufacture of very small parts, that no subsequent reduction by mechanical reduction gears is required, which generally leads to inaccuracies due to the unavoidable play. If measurements or adjustments are performed over selectively long ways, this is possible if a scale, shown in FIG. 4, is used. The showing of FIG. 4 corresponds substantially with that of FIG. 3, with the exception that the inclination and length of the images of the scale markers $5^2$ is arranged such, that upon reaching the highest diaphragm position, shown or indicated by the line 11, always the next scale marker is embraced in the lowermost diaphragm position, indicated by the line 12. The line 9 demonstrates again the direction of division. In order to bring about a continuous adjustment over a plurality of line markers, a discontinuous displacement of the diaphragm is required.

Figure 5:
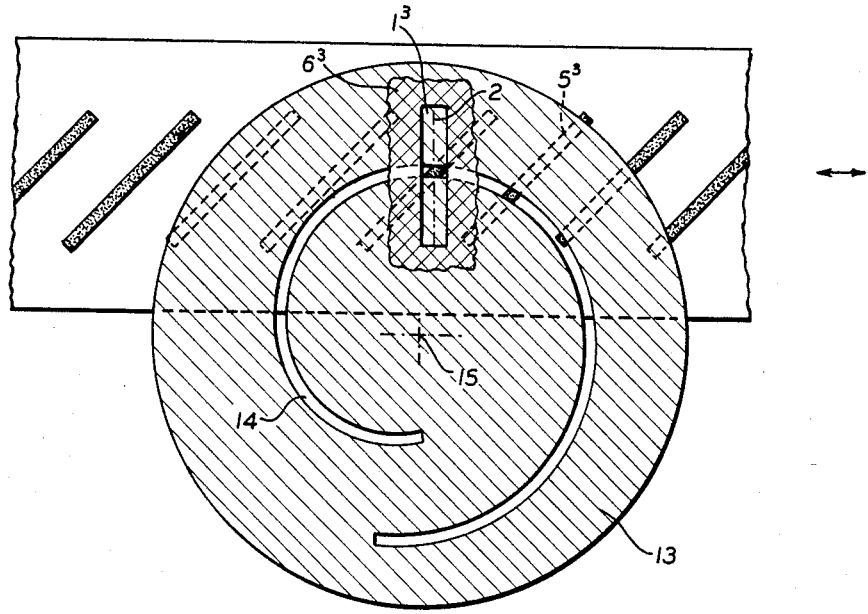
FIG. 5 is a schematic view of a rotating diaphragm.

By arranging a rotary diaphragm, shown in FIG. 5, this drawback is avoided. This figure shows clearly the light impermeable diaphragm body 13, a spiral-shaped light-transparent slot 14, said diaphragm having a rotary center 15, and again a second diaphragm $6^3$, so that a range of vision $1^3$ results. The images $5^3$ of the scale markers of a scale, which images $5^3$ are formed in accordance with the showing in FIG. 4, are shown in FIG. 5. The drawing shows quite clearly that the light-transparent slot 14 of the diaphragm 13 moves in the direction of the cross hair within the range of vision, as soon as the diaphragm 13 is turned about its center 15. If a table is controlled by the control motor (not shown), a rotary movement of the diaphragm 13 brings about a displacement of the table in the direction of the arrow. This displacement is not limited to the range of one image of the scale marker.

Figure 6:
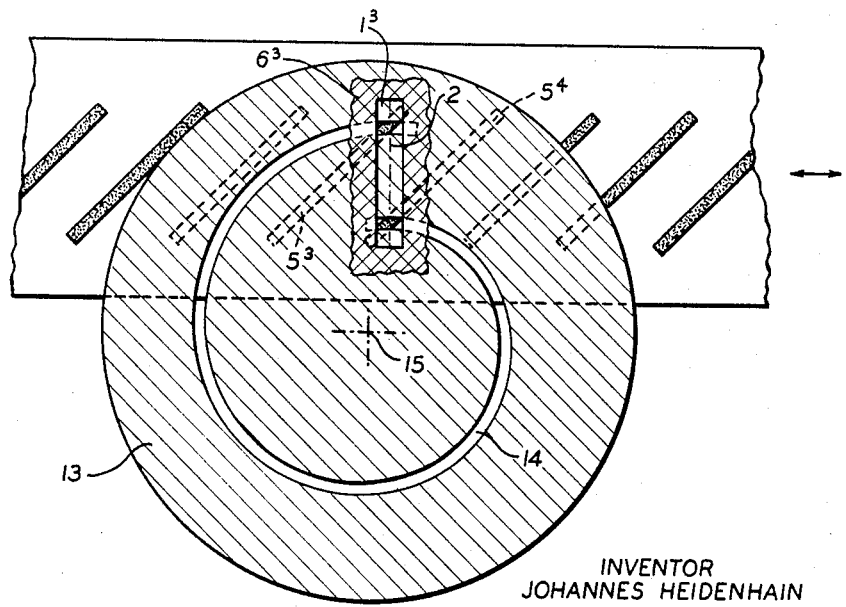
FIG. 6 is a schematic view indicating the transfer of the diaphragm shown in FIG. 5 from one scale marker to the next.

Referring now to FIG. 6 of the drawings, this figure shows the transfer of the diaphragm 13 from one image of the scale marker, to the next adjacent image. At the moment two adjacent images $5^3$ and $5^4$ are embraced simultaneously, a clear adjustment value results. During a complete rotation for 360° of the diaphragm, a slide displacement occurs for a distance equal with the distance of the interval arranged between two adjacent scale markers. By suitable formation of the spiral, a proportionality between the rotating angle of the diaphragm 13 and the displacement distance of the table may be brought about. Instead of using a scale with inclined lines, a normal scale may also be used. In this case the microscope must be turned for a corresponding angle.

The present device permits the transformation of a rotary movement into a linear movement, or vice versa, of a linear movement into a rotary movement. In the latter case, the control motor must engage the rotary diaphragm.

The present device can be used everywhere, where rotary movements must be transformed very exactly in longitudinal displacements. As an example, for instance, a spindle grinding machine may be cited. In this case, the rotary diaphragm is rigidly coupled with a shaft which turns the workpiece. The advance between the tool and the workpiece is obtained automatically by means of a control motor with greatest exactness, whereby always the connection with an exact scale is maintained. The spindle, manufactured in this manner, has not only small inner errors, but also a small absolute error over the entire length. It is, of course, also possible to work in such manner that the advance takes place arbitrarily and that the workpiece is rotated by a control motor, which simultaneously rotates the rotary diaphragm.

Figure 7:
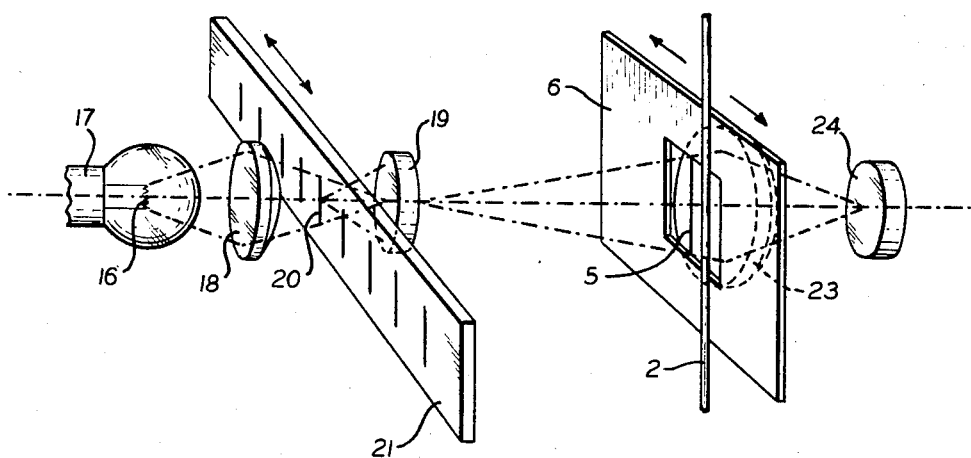
FIG. 7 is a schematic showing of a photo-electric microscope.

Referring now to FIG. 7, a photo-electric microscope, as applied in connection with the present device, is disclosed schematically.

The filament 16 of an incandescent lamp 17 is projected through a condenser 18 into an objective lens 19. The marker line 20 of the body 21, the displacement of which is to be measured, is imaged as image 5 of the marker line 20 in about the plane of the diaphragm 6. A cross hair 2 oscillates in a plane adjacent the plane of the diaphragm 6. A lens 23 reproduces the objective lens 19 on the photocell 24. The light rays impinging upon the photocell 24 are subjected to an impulse-like change at the moment of overlapping of the image 5 of the marker line 20 with the cross hair 2.

While I have disclosed several embodiments of the present invention, it is to be understood that these embodiments are given by example only and not in a limiting sense, the scope of the present invention being determined by the objects and the claims.

I claim:
1. An electric measuring and adjusting device for lengths comprising
    a photo-electric microscope including an oscillating scanning element performing a uniform movement over a linear indication range,
    a body having at least two marker lines constituting a first element, the displacement of which is to be measured,
    a first diaphragm, constituting a second element and having a cut-out including said indication range and exposing a portion of the length of at least one of said marker lines,
    a second diaphragm constituting a third element including a cut-out for determining the position of the zero indication of said photo-electric microscope by its position within the path of said photo-electric microscope and movable parallel to itself across said cut-out of said first diaphragm,
    said three elements having a common overlapping area and each of said three elements forming a different angle relative to the other of said three elements, and
    said linear indication range being only a portion of the scanning amplitude.
2. The device, as set forth in claim 1, wherein said marker line deviates from a straight line.

References Cited by the Examiner

UNITED STATES PATENTS

| | | | |
|---|---|---|---|
| 2,267,961 | 12/41 | Tillyer et al. | 88—14 |
| 2,375,665 | 5/45 | Koulicovitch. | |
| 2,406,299 | 8/46 | Koulicovitch. | |
| 2,604,528 | 7/52 | Obermaier | 250—233 |
| 2,628,539 | 2/53 | De Neegaard | 88—14 |
| 2,882,475 | 4/59 | De Neegaard | 88—14 |
| 2,959,087 | 11/60 | Strickland | 88—1 |
| 2,959,862 | 11/60 | Jager | 88—1 |
| 3,076,374 | 2/63 | De Neegaard | 88—14 |

FOREIGN PATENTS 1,101,220  4/55  France.

JEWELL H. PEDERSEN, *Primary Examiner.*
EMIL G. ANDERSON, *Examiner.*